Patented Sept. 20, 1932

1,877,870

UNITED STATES PATENT OFFICE

ERWIN HOFFA AND HANS HEYNA, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

NEW DYESTUFF OF THE THIOINDIGO SERIES

No Drawing. Application filed May 5, 1930, Serial No. 450,054, and in Germany May 18, 1929.

The present invention relates to new dyestuffs of the thioindigo series.

More particularly our invention is concerned with the dyestuffs of the following general formula:

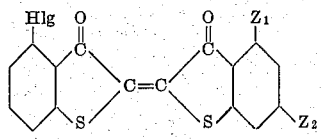

wherein Hlg stands for halogen,
$Z_1$ and $Z_2$ are different substituents and
$Z_1$ may stand for halogen, methyl or hydrogen and
$Z_2$ for halogen or hydrogen.

Processes of preparing our new compounds are obvious from their chemical structure. A preferred method comprises coupling such a hydroxythionaphthene compound as is substituted in the 4-position by halogen or a reactive α-derivative thereof with a suitable diketo compound or a reactive derivative thereof of the thioindigoide series.

Our new compounds yield dyeings of clear tints and possess good fastness properties. They are furthermore characterized by their good fixing power when being used as printing colors which property has rendered them particularly valuable for use as printing colors.

Among the above defined class of new dyestuffs the compounds of the following general formula are of particular interest:

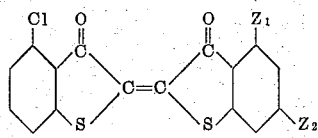

wherein $Z_1$ and $Z_2$ are different substituents and
$Z_1$ may stand for chlorine, methyl or hydrogen and
$Z_2$ for chlorine or hydrogen.

The fastness to light of these dyestuffs is remarkable.

The starting materials are obtainable by converting such 3-halogenphenyl-1'-thioglycolic acids as are substituted in the 2-position by a carboxylic acid group, a cyano group or a carboxy-amide group according to one of the known methods into the corresponding hydroxythionaphthene compounds.

The following examples are intended to illustrate our invention without limiting it, all parts being by weight:

(1) 10 parts of 3-chlorophenyl-1-thioglycol-2-carboxylic acid are heated for about 1 hour under reflux with 50 parts of acetic acid anhydride in the presence of 2 parts of anhydrous sodium acetate. From the reaction mass the acetic acid anhydride and acetic acid are distilled off, whereafter the 4-chloro-3-acetyloxythionaphthene is saponified and the hydroxythionaphthene is then isolated as usual. It has the melting point of about 119° C.–120° C. It is oxydized according to known methods whereby the dyestuff of the following probable formula:

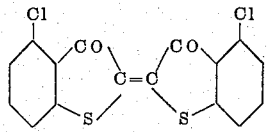

is obtained. It forms a red-violet powder and yield on cotton red tints of excellent fastness to light.

3-chlorophenyl-1-thioglycol-2 - carboxylic acid to be used according to these examples as starting material can be prepared by diazotizing 6-chloro-2-amino-1-benzoic acid, converting the diazo compound thus obtained into the xanthogenate ester, saponifying in an alkaline medium and condensing the mercaptane thus obtained with chloro-acetic acid.

(2) 32 parts of 4-methyl-6-chloro-2,3-diketo-dihyrdothionaphthenequinone-2-(p-dimethylamine)-anile are heated to boiling with 18.5 parts of 4-chloro-3-hydroxythionaphthene in 600 parts of acetic acid. The dyestuff thus obtained corresponds with the following probable formula:

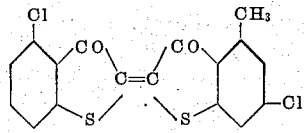

It is isolated by filtering the reaction mass and washing to neutral reaction. It dyes cotton in clear red tints of good fastness to washing and very good fastness to light.

(3) 31.6 parts of 6-chloro-2.3-diketo-dihydrothionaphthene-quinone-2-(p-dimethylamine)-anile are heated with 18.5 parts by weight of 4-chloro-3-hydroxythionaphthene in 600 parts of acetic acid until the formation of the dyestuff is finished. The reaction mass after having cooled down is filtered and washed to neutral reaction. It corresponds with the following probable formula:

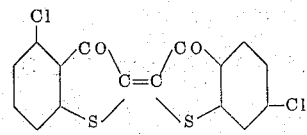

and dyes cotton red tints of excellent fastness to light.

(4) 28.5 parts of 4-methyl-2.3-diketo-dihydrothionaphthene-quinone-2-(p-dimethylamine)-anile are heated to boiling with 18.5 parts by weight of 4-chloro-3-hydroxythionaphthene in about 600 parts of acetic acid until the formation of the dyestuff is finished. The reaction mass after having cooled down is filtered off and washed to neutral reaction. The dyestuff thus obtained corresponds with the following probable formula:

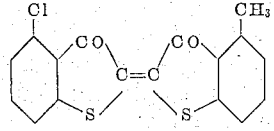

It yields on cotton red tints of excellent fastness to light.

We claim:

1. As new products, the compounds of the following probable formula:

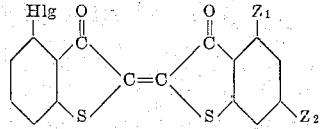

wherein Hlg stands for halogen,
$Z_1$ and $Z_2$ are different substituents and
$Z_1$ may stand for halogen, methyl or hydrogen and
$Z_2$ for halogen or hydrogen,
being dyestuffs possessing good fastness properties especially to light and yielding on cotton clear tints.

2. As new products, the compounds of the following probable formula:

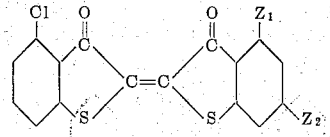

wherein $Z_1$ and $Z_2$ are different substituents and
$Z_1$ may stand for chlorine, methyl or hydrogen and
$Z_2$ for chlorine or hydrogen,
being dyestuffs possessing good fastness properties especially to light and yielding on cotton clear tints.

3. As new products, the compounds of the following probable formula:

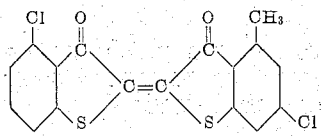

being dyestuffs possessing good fastness properties to washing and very good fastness to light and yielding on cotton clear red tints.

4. As a new product, the compound of the following probable formula:

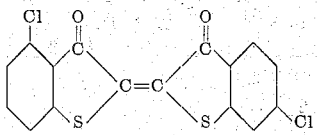

being dyestuff possessing excellent fastness properties to light and yielding on cotton red tints.

5. As a new product the compound of the following probable formula:

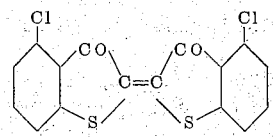

forming in the dry state a red-violet powder yielding red tints of excellent fastness to light.

In testimony whereof, we affix our signatures.

ERWIN HOFFA.
HANS HEYNA.